G. EACRET.
INDICATOR.
APPLICATION FILED JULY 14, 1914.

1,222,269.

Patented Apr. 10, 1917.
2 SHEETS—SHEET 1.

WITNESSES:
Albert R. Bromus
S. Constine

INVENTOR
Godfrey Eacret
BY
Acxev & Totten
ATTORNEYS

G. EACRET.
INDICATOR.
APPLICATION FILED JULY 14, 1914.
1,222,269.
Patented Apr. 10, 1917.
2 SHEETS—SHEET 2.
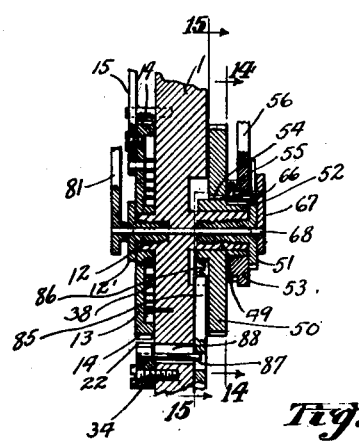
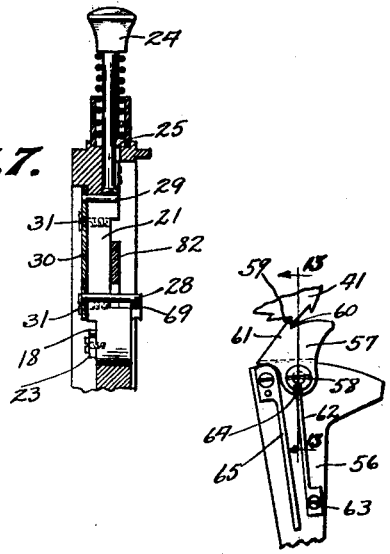
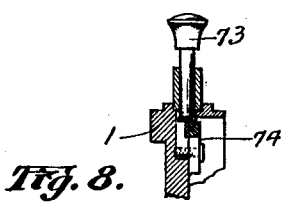
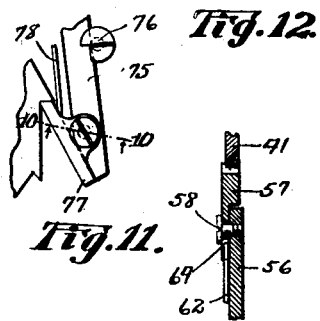
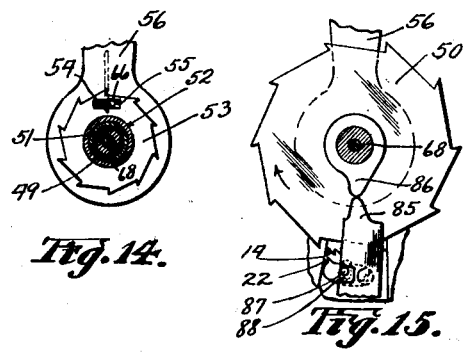
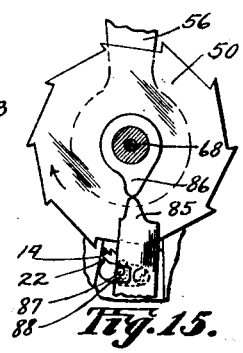
WITNESSES:
INVENTOR
Godfrey Eacret
BY
ATTORNEYS

UNITED STATES PATENT OFFICE.

GODFREY EACRET, OF SAN FRANCISCO, CALIFORNIA.

INDICATOR.

1,222,269.　　　　　Specification of Letters Patent.　　Patented Apr. 10, 1917.

Application filed July 14, 1914. Serial No. 850,869.

*To all whom it may concern:*

Be it known that I, GODFREY EACRET, a citizen of the United States, residing in the city and county of San Francisco and State of California, have invented certain new and useful Improvements in Indicators, of which the following is a specification.

The hereinafter described invention relates to improvements in indicators, and more particularly to a type of indicator designed for use by golfers, and by the use of which the number of strokes required to make each hole is separately indicated, as is also the number of strokes required to complete the course.

The invention has for its principal object to provide an indicator provided with a plurality of separate indicating devices independently operated by a common means which is adapted for successively coacting with said indicating devices; one provided with an indicator hand which indicates the totals of the indications on said separate indicating devices; one provided with a novel form of indicator reset means and one adapted to be conveniently carried on the person of the user.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the appended claims may be resorted to without departing from the spirit or sacrificing any of the advantages of the invention.

To more fully comprehend the invention, reference is directed to the accompanying drawings, wherein—

Fig. 7 is a sectional view taken on line 7—7 of Fig. 4, disclosing more fully the actuating means for the totals hand and for the means associated with the separate dials.

Fig. 8 is a sectional view taken on line 8—8 of Fig. 4, disclosing the operating stem and connection associated with the means for positioning the separate dial operating means.

Fig. 9 is an enlarged central sectional view of the center of the structure, more fully disclosing the assembling thereof.

Fig. 10 is a sectional view taken on line 10—10 of Fig. 6.

Fig. 11 is an enlarged detail view of the operating pawl associated with the positioning means for the separate dial actuating means.

Fig. 12 is an enlarged detail view of the pawl carried by the separate dial actuating means and in coöperation with one of the separate dial ratchets.

Fig. 13 is a sectional view taken on line 13—13 of Fig. 12.

Fig. 14 is a view taken on line 14—14 of Fig. 9.

Fig. 15 is a view taken on line 15—15 of Fig. 9.

Figure 1:
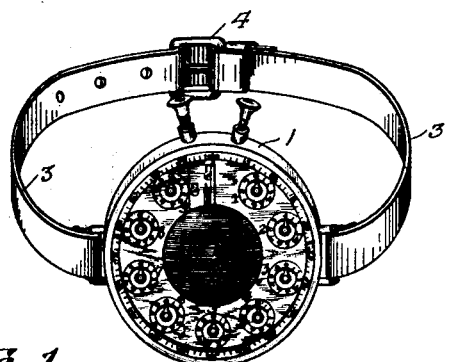
Figure 1 is a view in perspective of my invention.

Referring more particularly to the several views of the drawings, wherein like characters of reference designate corresponding parts throughout the several views, the numeral 1 designates a suitable disk shaped base carrying at its peripheral edge suitable stirrups 2 to which are secured the ends of straps 3 secured together by a buckle 4 and providing a means for attaching the indicator to the person of the user. One face of said base is formed with an annular totals dial 5 provided with peripheral graduations 6 which are consecutively numbered in groups of five, as at 7. The face of said base is also provided adjacent the graduations on said dial 5 with a plurality of small circular or trip dials 8 having numerical indications 9 thereon and each dial is consecutively numbered, as at 10. The front of the base 1 is recessed, as at 11, and centrally of said recess is rotatably mounted on a boss 12 projecting upwardly from the base by a threaded receiving member 12′, a hand supporting disk 13 serrated at its edge, as at 14, and carrying an indicating hand 15 for coöperation with the totals dial 5. The indicating hand is advanced one graduation at a time on the totals dial 5 by a suitable toothed pawl 16 pivotally connected, as at 17, to one end of a lever 18 mounted, as at 19, to the base 1. The beveled end 20 of the pawl 16 is normally forced in contact with a directing screw 21 to disengage the tooth 22 of the pawl from the serrations 14 by a spring 23 coöperating with the upper end of the lever 18.

Figure 2:
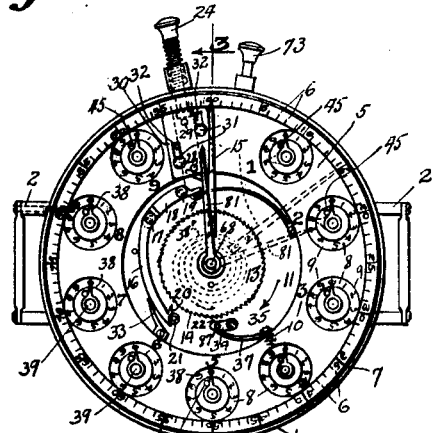
Fig. 2 is an enlarged front plan view, disclosing the totals dial and indicator hand associated therewith, the separate dials and the hand for indicating which separate dial is in coöperative relation with the actuating stem.

The pawl 16 is actuated by a headed stem 24 mounted to reciprocate through an opening 25 in the base and extending from the periphery thereof. Pins 28 and 29 project from a guide plate 30 secured by screws 31 operating through slots 32 to the base 1 and said pins operate in an opening 27 in the base, as in Figs. 4 and 7. The pin 29 is normally in contact with the lower end of the stem 24 and the pin 28, when the stem 24 is pressed inwardly, coacts with the upper end of the lever 18 and raises the pawl 16 which is forced on its upward stroke into contact with the serrations 14 by a spring 33, as in Fig. 2, and in dotted lines in Fig. 5. A retaining pawl 34 pivotally mounted, as at 35, and forced inwardly by a spring 37, coacts with the serrations 14 and retains the totals hand in its advanced position until released in a hereinafter described manner.

A hair spring 38′ is mounted in a recess in the under portion of the supporting disk 13 and is connected at one end to the base 1 and at its opposite end to the disk 13 and returns the totals hand to its normal position on the release of said retaining pawl 34.

Figure 3:
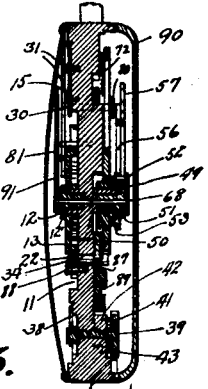
Fig. 3 is a vertical sectional view taken on line 3—3 of Fig. 2 looking in the direction of the arrows.

An indicating hand 38 coöperates with the numerals 9 on each of the trip dials 8 and said hands are carried by members 39 extending through and rotatably mounted in suitable openings in the base 1, and said members 39 each carry on their rear end a ratchet wheel 41 rotatable on a boss 42. Hair springs 43 are connected at one end with each of said members 39 and their opposite ends are secured to pins 44 to normally maintain the hands 38 at zero on the trip dials and in contact with the pins 45 on the dial faces, as in Figs. 2, 3 and 4 of the drawings. Suitable pawls 46 having beveled ends 47 are pivotally mounted adjacent each ratchet wheel 41 and are normally forced in contact therewith by springs 48.

The mechanism for operating the ratchet wheels of the trip dials is constructed in the following manner—particular attention being had to Figs. 3 to 6 and 9 of the drawings. A boss 49 formed centrally of the rear of the base 1 rotatably mounts a ratchet wheel 50 retained in position by a screw 51 and loosely mounted on a boss 52 formed on said ratchet wheel 50, and retained in position by the screw 51 is another ratchet wheel 53 which is free to move a slight distance on said ratchet wheel 50, but is adapted to rotate therewith through a pin 54 operating in a slot 55 in the ratchet wheel 53—Figs. 9 and 14 of the drawings. An arm 56 is carried by the ratchet wheel 53 and said arm carries at its end a pawl 57 which projects beyond the end of the arm and is pivotally mounted thereon by a screw 58 and said pawl is formed with an engaging tooth 59 having a straight face 60 and a beveled face 61, as in Fig. 12. The tooth 59 of said pawl is adapted, when said arm is positioned adjacent the respective ratchets 41, to engage with the teeth thereof and rotate the same to move the hand associated therewith one point on its dial on each inward movement of the stem 24. A spring 62 secured by a screw 63 to the arm 56 seats at its free end in a recess 64 in the pawl 57 and said spring normally maintains one side edge of said pawl in contact with the stationary end of a spring 65 extending longitudinally of the arm 56. The free end of said spring 65 operates between the pin 54 projecting outwardly through the slot 55 and a pin 66 carried by an arm 67 which is mounted to rotate on said screw 51 by a pin 68 extending centrally through the screws 51 and 12′ and base member 1, and said spring returns said arm 56 to its normal position after having been actuated in a hereinafter described manner, to rotate one of the ratchet wheels 41 one step.

Figure 4:
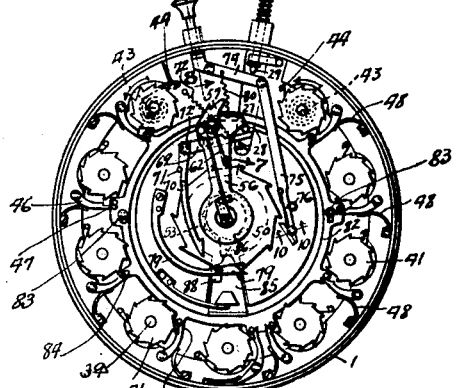
Fig. 4 is a view in rear elevation, disclosing the ratchet wheel associated with each separate dial hands, the ratchet wheel retaining pawls, the means for actuating the ratchets of the separate dials, the means for moving the actuating means relative to the respective ratchets, and the ratchet retaining pawl releasing means releasing the pawls from their respective ratchets.
Figure 5:
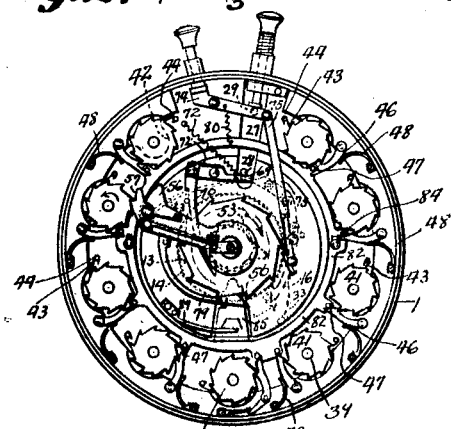
Fig. 5 is a view similar to Fig. 4 but disclosing the means for actuating the ratchets of the separate dials after having engaged one of said ratchets and rotated the same one step.
Figure 6:
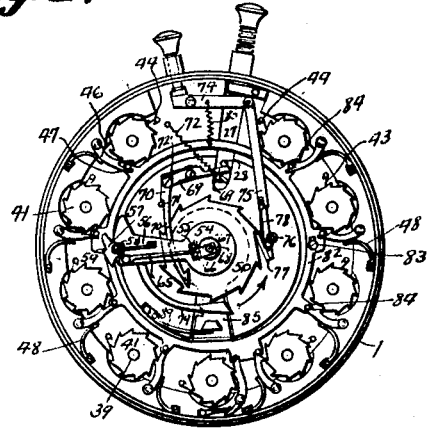
Fig. 6 is a view in rear elevation disclosing the means for actuating the ratchets of the separate dials as being moved from one ratchet to another.

The mechanism for operating the arm 56 to rotate the ratchet wheels 41 is constructed and operates in the following manner—see Figs. 4, 5 and 6 of the drawings. The pin 28 carried by the slide 30 associated with the stem 24 is adapted, when the stem is depressed, to depress one end of a pivoted lever 69 which pivotally mounts on its opposite end a pawl 70, the toothed end of which coacts on the upward movement of said pawl through the action of a guide pin 71 thereon with the ratchets of the wheel 53. The pawl 70 on its upward movement moves the wheel 53 and the arm 56 carried thereby a slight distance relative to the boss 52 so that the tooth of the pawl 57, which is in engagement with one of the ratchets 41 will rotate the ratchet one step to advance the hand associated therewith one numeral relative to its dial. Springs 72 and 72' cause the pawl 70 to disengage the ratchet wheel 53 on the release of pressure on the stem 24 and the spring 65 operating between the pins 55 and 66 returns the arm 56 to its normal position and causes the beveled side 61 of the pawl 57 to ride free on the ratchets. By referring to Figs. 5 and 7, it will be apparent that each depression of stem 24 will cause the hand 38 of the trip dial with which the pawl is associated to be advanced one numeral on the dial and it will also cause the totals hand 15 to be advanced one graduation on the dial 5.

The mechanism for moving the arm 56 and pawl 57 from engagement with one of the ratchet wheels 40 to engagement with another is constructed and operates in the following manner, attention being directed to Figs. 4, 6, 10 and 11. A headed trip stem 73 extends laterally from the base 1 adjacent the stem 24, and the same operates one end of a pivoted lever 74 pivotally mounting an arm 75, the lower end of which is retained adjacent the ratchet wheel 50 by a screw 76. A pawl 77 outwardly pressed by the opening 78 is pivotally carried at the lower end of the arm 75, and the same is adapted on the upward movement of the arm 75, caused by the inward depressing of the stem 73, to engage with the teeth of the ratchet wheel 50, and rotate the same on the boss 49—as in Fig. 6. The movement of the ratchet wheel 50 will, through the pin 54, also rotate the ratchet wheel 53, carrying the arm 56, and will move the pawl 57 from the ratchet 41 of one trip dial to the ratchet of another. The stroke of the lever 74 is sufficient on each full depression of the stem 73 to move the end of the arm 56 from the ratchet of one trip dial to the ratchet of another and said ratchet wheel 50 is maintained in its adjusted position by a spring 79 which coöperates with the teeth thereof. A coiled spring 80 normally maintains the lever 74 and parts carried thereby in the position as shown in Fig. 4.

A hand 81 is carried by the forward end of the pin 68 and the same rotates with the movement of the arm 56 from one trip dial to the other, and indicates on the numerals 10 on the dial the ratchet of the trip dial with which the pawl 57 is in coöperative engagement.

The means for releasing the retaining pawls 46 and the pawl 34 on the completion of the movement of the arm 56 relative to the trip dials to permit the hands 38 and hand 15 to be returned to zero positions on their dials, is constructed and operates in the following manner.

An annular ring 82 is movably mounted on guide pins 83 and the same carries a plurality of pins 84, one of which coöperates with each beveled face 47 of the retaining pawls 46. The ring 82 carries a lug 85 which is adapted, when the pawl 57 carried by the arm 56 is removed from trip dial member 9, to be engaged by a cam 86 carried by the hub portion of the wheel 50 and arranged diametrically opposite the arm 56 and the action of the cam will operate the ring 82 to cause the pins 84 carried thereby to ride on the beveled faces of the pawls 46 and release the same from their respective ratchets which will permit the springs 43 to return the hands 38 to zero on the dials. A pin 87 is carried by the pawl 34, Fig. 16, and the same projects in an opening 88 in the lug 85 and when said lug is depressed by the cam 86 against the action of the retaining spring 89 the pawl 34 is also disengaged from the serrations on the disk 13 which permits the spring 12' to return the hand 15 to zero on the dial 5.

A back 90 is detachably mounted to the rear portion of the base 1 and the dial or face is covered by a crystal 91 formed centrally with an opaque portion adapted to conceal the mechanism carried in the depression 11.

When in use, the player, when starting from the first green, depresses the trip stem 73 which positions the trip dial actuating mechanism in engagement with the ratchet of trip dial numbered 1, and also operates the hand 81 to point to said dial. On each stroke made by the player, the stem 24 is depressed which causes the hand 15 to advance one graduation on the totals dial 5 and causes the arm 56 to be operated, which operates the hand 38 to advance one numeral on dial number one. Should it take, for example, seven strokes to make the first hole, the stem 24 will have been depressed seven times, the hand 15 will point to the seventh graduation on the totals dial 5 and the hand associated with the trip dial 1 will also point to the numeral 7 thereon, as in Fig. 2.

On starting from the second green, the player depresses the stem 73 which moves the trip dial actuating means from contact with the ratchet of dial 1 into contact with the ratchet of dial 2, the ratchet of dial 1 being held in its advanced position by its pawl 46. After each stroke from the second green, the player depresses the stem 24 which, as before, causes the hand 15 to be advanced one graduation on each depression, and also causes the hand 38 of trip dial 2 to be advanced one numeral on each depression, and if it takes eight strokes to make the hole of the second green, the hand 15 will register with the numeral 15 on the totals dial 5, as this is the total number of strokes made, the hand 38 of trip dial 1 will register with its numeral 7 and the hand 38 of trip dial 2 will register with its numeral 8, they being the respective number of strokes required to make the holes of the respective greens. The above mentioned operations are performed while playing each green, and should the course contain 9 holes and the ninth one being completed, the player depresses the stem 73, which at this time causes the cam 86 to contact with the lug 85 which depresses the releasing ring 82 causing the pins 84 carried thereby to disengage the respective pawls associated therewith from their respective ratchets which will permit the springs 43 to return the hands to zero position on the dials. The movement of the lug 85 will also cause the pawl 34 to be released from the disk 13 which will permit the spring 38' to return the hand 15 to zero position on the dial after which time the dials will be clear and the device will be again ready for use.

Having thus described my invention what I claim and desire to protect by Letters Patent is:—

1. A device of the character described, comprising a plurality of trip indicators, a totals indicator, pawl and ratchet mechanism for operating the totals indicator, pawl and ratchet mechanism for operating all of the trip indicators one at a time, said last mentioned pawl and ratchet mechanism being movable from one trip indicator to another into operative relation therewith, means for shifting said pawl and ratchet mechanism from one trip indicator to another, and a single actuating means for the pawl and ratchet mechanism for the totals indicator and the pawl and ratchet mechanism of the trip indicators.

2. A device of the character described, comprising a plurality of trip indicators, each trip indicator including a ratchet wheel, operating means for all of said trip indicators including a pawl movable from one to another of said ratchet wheels into operative relation therewith, pawl and ratchet mechanism for actuating the said pawl, and means for shifting the pawl from one to another of the ratchet wheels.

3. An indicator comprising a plurality of trip indicating mechanisms, means for operating said mechanisms one at a time, means for moving said operating mechanism from one to another of said indicating mechanisms, and means for restoring said indicating mechanisms to normal position on the disengagement of said operating means from engagement with the last of said indicating mechanisms.

4. An indicator comprising a plurality of trip indicating mechanisms, means for operating said mechanisms one at a time, means for moving said operating mechanism from one to another of said indicating mechanisms, means for retaining said indicating mechanisms in their adjusted position on the removal of the operating means therefrom, means for restoring said indicating mechanisms to normal position on the release of said retaining means, and means for releasing said retaining means on the disengagement of said operating means from the last of said indicating mechanisms.

5. A device of the character described, comprising a plurality of trip indicators, each trip indicator including a ratchet wheel, operating means for all of said trip indicators including a rotatable support, an arm mounted on said support, a pawl carried by the arm, means for turning the support to move the arm with its pawl from one of the said ratchet wheels to another, said arm being rotatable relative to its support, and actuating means for the arm.

6. A device of the character described, comprising a plurality of trip indicators, each trip indicator including a ratchet wheel, operating means for all of said trip indicators including a rotatable support, an arm mounted on said support, a pawl carried by the arm, means for turning the support to move the arm with its pawl from one of the said ratchet wheels to another, said arm being rotatable relative to its support, and pawl and ratchet mechanism for actuating the said pawl.

7. An indicator comprising a plurality of trip indicating mechanism, a totals indicating mechanism, means for operating said trip and totals indicating mechanisms, means for moving the trip indicating mechanism operating means successively from one to another of said mechanisms, means for retaining the totals indicating mechanism in its adjusted position, means for retaining each of the trip indicating mechanisms in their adjusted positions, means acting automatically to release both the retaining means for the totals indicating mechanism and the retaining means for the trip indicating mechanism upon the disengagement of said operating means from the last of the trip indicating mechanisms, and means for restoring the trip indicating mechanisms and the totals mechanism to normal position upon the release of said retaining means.

8. A device of the character described, comprising a plurality of trip indicators, each trip indicator including a ratchet wheel, operating means for all of said trip indicators including a rotatable support, an arm mounted on said support, a pawl carried by the arm, means for turning the support to move the arm with its pawl from one of the said ratchet wheels to another, said arm being rotatable relative to its support, pawl and ratchet mechanism for actuating the said arm, and yieldable means acting to maintain the arm in fixed relation to the support.

9. A device of the character described, comprising a plurality of trip indicators, each trip indicator including a ratchet wheel, operating mechanism for all of said trip indicators including a pawl supported for rotation and movable from one of said ratchets to another into operative relation therewith, actuating means for the pawl, means for moving the pawl from one of said ratchet wheels to another, means for retaining said indicators in their adjusted position on the removal of the operating pawl therefrom, and means for releasing said retaining means on the disengagement of the operating pawl from the last of said indicating mechanism, said means including a part on said pawl, an annular member connected with said retaining means, and a part on said annular member adapted to be engaged by the part on said arm.

10. A device of the character described, comprising a plurality of trip indicators, each trip indicator including a ratchet wheel, operating mechanism for all of said trip indicators including a pawl supported for rotation and movable from one of said ratchets to another into operative relation therewith, means for moving the pawl from one of said ratchet wheels to another, retaining pawls for each of said ratchet wheels, a totals indicator, operating mechanism for the totals indicator, means common to both the trip indicator operating mechanism and the totals indicating operating mechanism for actuating the same, a retaining pawl for the totals indicator, and means for releasing the retaining pawls for the totals indicator and all of the trip indicators upon the disengagement of the operating pawl from the last of said trip indicator ratchet wheels, said means including a part on said pawl, an annular member mounted for rotation and connected with the retaining pawls of the ratchet wheels of the trip indicators, a part on the annular member adapted to be engaged by the part on the said pawl, and a part on the retaining pawl of the total indicator adapted to be engaged by said annular member.

11. A device of the character described, comprising a plurality of trip indicators, each trip indicator including a ratchet wheel, operating means for all of the trip indicators including a rotatable support, a ratchet wheel loosely mounted on said support and provided with an arm extending outwardly therefrom, a pawl carried by said arm, means for turning the support to move the arm with its pawl from one of the ratchet wheels of the trip indicators to another, said ratchet wheel being rotatable relative to its support, a pawl and pawl actuating means for the ratchet wheel, and a connection between the ratchet wheel and the rotatable support for limiting the movement of the former relative to the latter.

12. A device of the character described, comprising a plurality of trip indicators, each trip indicator including a ratchet wheel, operating means for all of the trip indicators including a rotatable support, a ratchet wheel, loosely mounted on said support and provided with an arm extending outwardly therefrom, a pawl carried by said arm, means for turning the support to move the arm with its pawl from one of the ratchet wheels of the trip indicators to another, said ratchet wheel being rotatable relative to its support, a pawl and pawl actuating means for the ratchet wheel, a connection between the ratchet wheel and the rotatable support for limiting the movement of the former relative to the latter, and a spring secured to said arm and engaging a part on the rotatable support to maintain the arm and ratchet wheel in fixed relation to the support.

13. An indicator comprising a plurality of trip indicating mechanisms and a totals indicating mechanism, means adapted for coöperation with each of said trip indicating mechanisms for operating the same, means for moving said operating means successively from one trip indicating mechanism to another, means for operating said totals indicating mechanism on each operation of the trip indicating mechanism, means for actuating said trip and totals operating means, and means acting to reset said trip and totals indicating mechanisms to normal position on the disengagement of said trip indicating mechanism operating means from certain trip indicating mechanisms.

In testimony whereof I have signed my name to this specification in the presence of two subscribing witnesses.

GODFREY EACRET.

Witnesses:
HARRY A. TOTTEN,
S. CONSTINE.

Copies of this patent may be obtained for five cents each, by addressing the "Commissioner of Patents, Washington, D. C."